US008729861B2

(12) United States Patent
Nishida et al.

(10) Patent No.: US 8,729,861 B2
(45) Date of Patent: May 20, 2014

(54) POWER STORAGE SYSTEM

(75) Inventors: Takehiko Nishida, Nagasaki (JP);
Katsuaki Kobayashi, Nagasaki (JP);
Tomoh Akiyama, Hiroshima (JP);
Katsuo Hashizaki, Nagasaki (JP);
Hidehiko Tajima, Nagasaki (JP);
Kazuyuki Adachi, Fukuoka (JP); Shinji Murakami, Fukuoka (JP); Yoshihiro Wada, Fukuoka (JP); Hiroyuki Shibata, Fukuoka (JP); Kouji Kurayama, Fukuoka (JP)

(73) Assignees: Mitsubishi Heavy Industries, Ltd., Tokyo (JP); Kyushu Electric Power Co., Inc., Fukuoka-shi, Fukuoka (JP)

( * ) Notice: Subject to any disclaimer, the term of this patent is extended or adjusted under 35 U.S.C. 154(b) by 875 days.

(21) Appl. No.: 12/677,217

(22) PCT Filed: Mar. 31, 2008

(86) PCT No.: PCT/JP2008/056369
§ 371 (c)(1),
(2), (4) Date: Apr. 28, 2010

(87) PCT Pub. No.: WO2009/037881
PCT Pub. Date: Mar. 26, 2009

(65) Prior Publication Data
US 2010/0207580 A1    Aug. 19, 2010

(30) Foreign Application Priority Data
Sep. 18, 2007    (JP) .................. 2007-240794

(51) Int. Cl.
*H02J 7/00* (2006.01)
*H02J 7/04* (2006.01)

(52) U.S. Cl.
USPC .......... 320/132; 320/128; 320/134; 320/136; 320/152; 320/157

(58) Field of Classification Search
CPC ..................................... Y02E 60/12
USPC ............................................ 320/132
See application file for complete search history.

(56) References Cited

U.S. PATENT DOCUMENTS

2007/0029972 A1*    2/2007    Lampe-Onnerud et al. .. 320/132

FOREIGN PATENT DOCUMENTS

| JP | 2000-058134 A | 2/2000 |
| JP | 2000-113909 A | 4/2000 |

(Continued)

OTHER PUBLICATIONS

Chinese Office Action mailed Mar. 30, 2012, issued in corresponding Chinese Patent Application No. 200880104033.3, with English translation (15 pages).

(Continued)

*Primary Examiner* — Edward Tso
*Assistant Examiner* — Ahmed Omar
(74) *Attorney, Agent, or Firm* — Westerman, Hattori, Daniels & Adrian, LLP

(57) ABSTRACT

It is an object to provide a battery system whose life can be extended. A cell pack having at least one lithium secondary battery that uses a manganese-based cathode material and a control unit that controls charging and discharging of the cell pack are provided, and the control unit controls charging and discharging within a low-degradation voltage range that is set on the basis of a target cell degradation rate.

14 Claims, 4 Drawing Sheets

(56) References Cited

FOREIGN PATENT DOCUMENTS

| | | | | |
|---|---|---|---|---|
| JP | 2001-307781 | A | | 11/2001 |
| JP | 2002-315231 | A | | 10/2002 |
| JP | 2003-199211 | A | * | 7/2003 |
| JP | 2003-297435 | A | | 10/2003 |
| JP | 2004-186087 | A | | 7/2004 |
| JP | 2004-260905 | | * | 9/2004 |
| JP | 2004-260905 | A | | 9/2004 |
| JP | 2006-278132 | A | | 10/2006 |
| JP | 2008-024124 | A | | 2/2008 |
| JP | 2008-060020 | A | | 3/2008 |
| JP | 2008-092710 | A | | 4/2008 |
| JP | 2008-308122 | A | | 12/2008 |

OTHER PUBLICATIONS

Decision of Patent Grant dated May 9, 2012, issued in corresponding Korean Patent Application No. 2010-7003155, with English translation (5 pages).

International Search Report of PCT/JP2008/056369, mailing date of Jul. 1, 2008.

Decision to Grant dated Jun. 18, 2013, issued in corresponding Japanese application No. 2007-240794, with English Translation (7 pages).

Chinese Notice of Allowance dated Jun. 21, 2013, issued in corresponding Chinese Patent Application No. 200880104033.3 (2 pages) (Statement of relevance: the Notice of Allowance has been received).

* cited by examiner

FIG. 5

| OPERATION MODE | MECHANISM | OPERATION |
|---|---|---|
| (1) GRID-CONNECTED LOAD LEVELING | 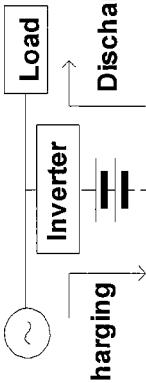 | CHARGE FROM GRID POWER DURING SET PERIOD AND SUPPLY POWER TO LOAD DURING SET PERIOD |
| (2) GRID-CONNECTED PEAK CLIPPING | 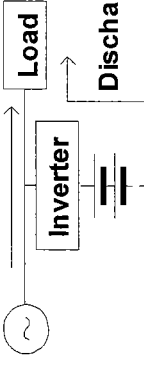 | CHARGE FROM GRID POWER DURING SET PERIOD AND SUPPLY POWER EXCEEDING CONTRACT POWER TO LOAD DURING SET PERIOD |
| (3) FORCED CHARGING | 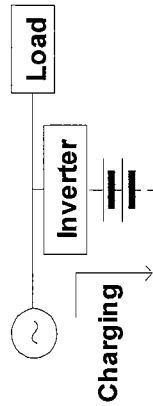 | MANUALLY CHARGE BATTERY |
| (4) FORCED DISCHARGING | 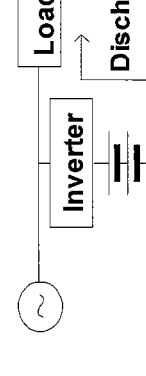 | MANUALLY DISCHARGE BATTERY |

POWER STORAGE SYSTEM

TECHNICAL FIELD

The present invention relates to a battery system including a lithium secondary battery that uses a manganese-based cathode material.

BACKGROUND ART

It is known that the performance of lithium secondary batteries becomes degraded when they are used in a high-voltage region or a low-voltage region. Therefore, lithium secondary batteries are generally used in a voltage range not including cell voltages that cause performance degradation (e.g., a voltage range with which single-cell voltages become higher than or equal to 2.2 V and lower than or equal to 4.2 V).

Furthermore, in the case of lithium secondary batteries that use a manganese-based cathode material, cell degradation occurs considerably at high temperatures, for example, it has been proposed that the batteries be used in a voltage range close to the high-voltage region at high temperatures (e.g., Patent Citation 1).

Furthermore, in consideration of safety, lithium secondary batteries are stored in an intermediate state of charge (e.g., an open-circuit voltage (single-cell voltage with no current flowing) in a range of 3.5 V to 3.8 V) or in a discharged state (e.g., an open-circuit voltage of 3.5 V or lower).

Patent Citation 1: Japanese Unexamined Patent Application, Publication No. 2000-058134

DISCLOSURE OF INVENTION

The inventors have discovered that a voltage range with a high cell degradation rate is included in the above-described voltage range at the time of battery usage in the existing art (e.g., a voltage range with which single-cell voltages become higher than or equal to 2.2 V and lower than or equal to 4.2 V).

When charging and discharging are performed in this voltage range, cell degradation could be promoted and the battery life could be reduced. Particularly in the case of a large-scale battery system with a target life span of ten years or longer, it is important to use the battery in a voltage range with minimum possible cell degradation.

The present invention has been made in order to solve the above problem, and it is an object thereof to provide a battery system whose life can be extended.

In order to solve the above problem, the present invention employs the following solutions.

A first aspect of the present invention is a battery system including a battery unit having at least one lithium secondary battery that uses a manganese-based cathode material; and a control unit that controls charging and discharging of the battery unit, wherein the control unit controls charging and discharging within a low-degradation voltage range that is set on the basis of a target cell degradation rate.

For example, through a study of the relationship between the open-circuit voltage and the capacity reduction rate (i.e., the cell degradation rate), it has been discovered that the cell degradation rate is highest in the vicinity of 3.5 V, as in an example shown in FIG. 2. Therefore, cell degradation is promoted if the battery unit is used in a wide voltage range including 3.5 V, as in the existing art.

In this aspect, since the battery unit is used within the low-degradation voltage range that is set on the basis of the target cell degradation rate, it is possible to avoid usage at the above-described cell voltage with a high cell degradation rate. Accordingly, it is possible to reduce the degradation rate of the battery unit.

In the battery system described above, when a cell voltage goes out of the low-degradation voltage range, the control unit may perform charging or discharging until the cell voltage coincides with a reference cell voltage that is set within the low-degradation voltage range on a high-voltage side.

As described above, when the cell voltage goes out of the low-degradation voltage range, charging or discharging is performed until the cell voltage coincides with the reference cell voltage set on the high-voltage side of the low-degradation voltage range, so that it becomes possible to constantly keep the state of charge of the battery unit at a high level. Accordingly, it is possible to supply a greater amount of power at the time of discharging.

In the battery system described above, a plurality of operation modes including a low-degradation operation mode may be provided, and the control unit may control charging or discharging within the low-degradation voltage range when the low-degradation operation mode is selected.

Since the battery unit is used within the low-degradation voltage range only during a period when the low-degradation operation mode is selected, it becomes possible to control charging and discharging in an operation mode in accordance with the required power while suppressing degradation of the battery unit.

A second aspect of the present invention is a battery system including a battery unit having at least one lithium secondary battery that uses a manganese-based cathode material; and a control unit that controls charging and discharging of the battery unit, wherein the control unit controls charging and discharging within a low-degradation state-of-charge range that is set on the basis of a target cell degradation rate.

For example, through a study of the relationship between the state of charge and the capacity reduction rate (i.e., the cell degradation rate), it has been discovered that the cell degradation rate is highest in the vicinity of 30%, as in an example shown in FIG. 3. Therefore, cell degradation is promoted if the battery unit is used in a wide state-of-charge range including 30%, as in the existing art.

In this aspect, since the battery unit is used within the low-degradation state-of-charge range that is set on the basis of the target cell degradation rate, it is possible to avoid usage at the above-described state of charge with a high cell degradation rate. Accordingly, it is possible to reduce the degradation rate of the battery unit.

In the battery system described above, when a state-of-charge goes out of the low-degradation state-of-charge range, the control unit may perform charging or discharging until the state of charge coincides with a reference state of charge that is set within the low-degradation state-of-charge range on a high-state-of-charge side.

As described above, when the state of charge goes out of the low-degradation state-of-charge range, charging or discharging is performed until the state of charge coincides with the reference state of charge set on the high-state-of-charge side of the low-degradation state-of-charge range, so that it becomes possible to keep a high state of charge. Accordingly, it is possible to supply a greater amount of power at the time of discharging.

In the battery system described above, a plurality of operation modes including a low-degradation operation mode may be provided, and the control unit may control charging and discharging within the low-degradation state-of-charge range when the low-degradation operation mode is selected.

Since charging and discharging are performed so that the state of charge of the battery unit comes in the low-degradation state-of-charge range only during a period when the low-degradation operation mode is selected, it becomes possible to control charging and discharging in an operation mode in accordance with the usage state while suppressing degradation of the battery unit.

The battery system described above may include an input unit for manually setting switching of the operation modes.

With this configuration, a user can freely perform switching of the operation modes in accordance with the usage state, etc.

In the battery system described above, a switching condition of the operation modes may be registered in advance in the control unit, and switching of the operation modes may be performed on the basis of the switching condition.

With this configuration, it becomes possible to switch the operation modes at suitable timing in accordance with the required power, etc. Furthermore, since switching of the operation modes is performed automatically, the burden on the user is alleviated.

The battery systems according to the present invention are suitable for use in power storage systems in which charging is performed in a preset period (e.g., a nighttime period) and discharging is performed in a preset period (e.g., a daytime period). By using the battery systems according to the present invention in power storage systems with large battery capacities, it becomes possible to extend the life.

Furthermore, the above aspects may be used in permissible combinations.

According to the present invention, an advantage is afforded in that it is possible to extend the life.

BRIEF DESCRIPTION OF DRAWINGS

FIG. 5 is a table showing an example of various operation modes belonging to a normal operation mode.

EXPLANATION OF REFERENCE 1, 1': Battery systems
2: Cell pack
3, 3': Control units
4: Power conditioning unit
5: Load

BEST MODE FOR CARRYING OUT THE INVENTION

Hereinafter, an embodiment of a battery system according to the present invention will be described with reference to the drawings.

First Embodiment

Figure 1:
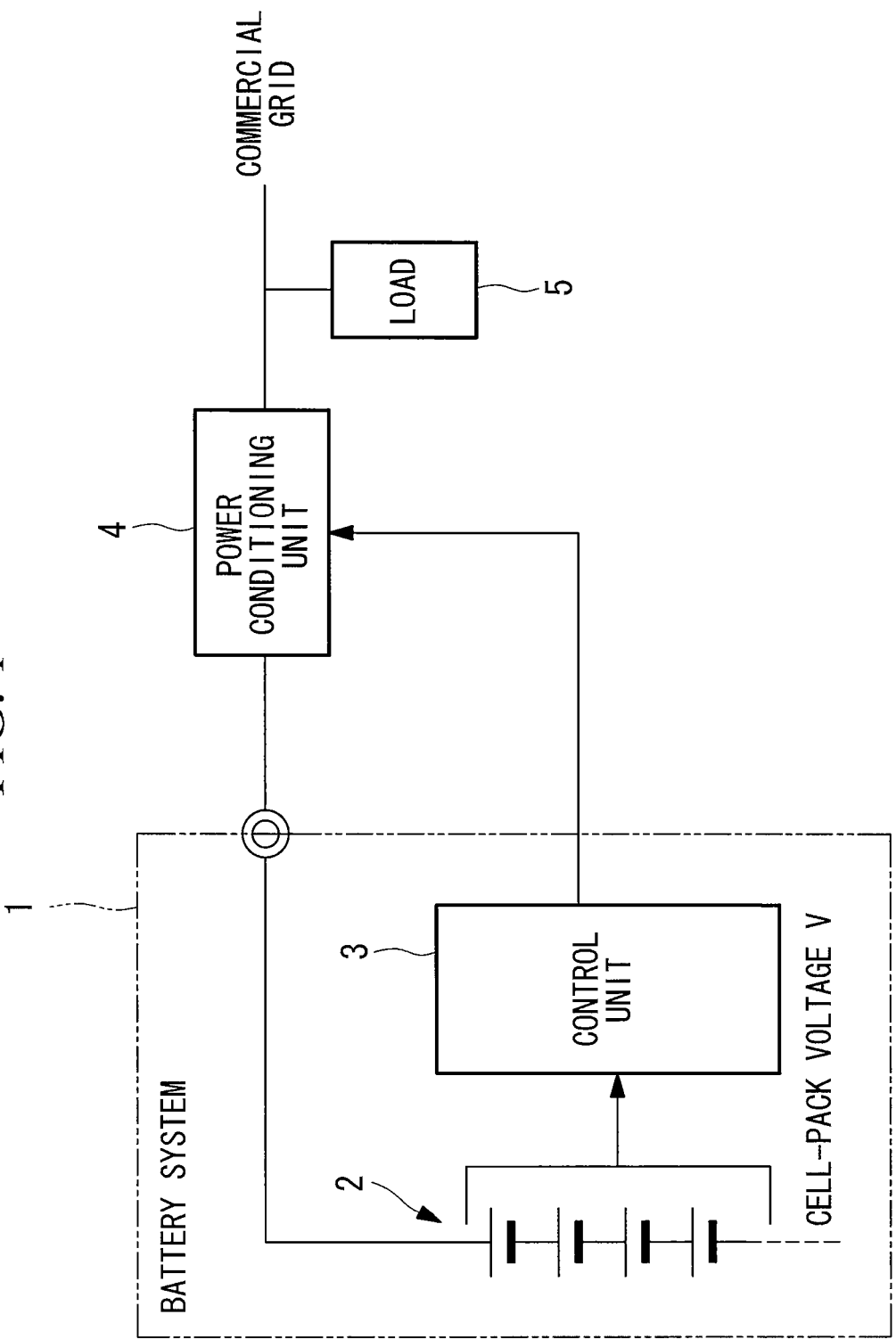
FIG. 1 is a diagram schematically showing the configuration of a battery system according to a first embodiment of the present invention.

FIG. 1 schematically shows the configuration of a battery system according to this embodiment.

As shown in FIG. 1, a battery system 1 according to this embodiment includes a cell pack (battery unit) 2 including a plurality of lithium secondary batteries that use a manganese-based material for their cathodes and a control unit 3 that controls charging and discharging of the cell pack 2. The battery system 1 is connected to a load 5 and a commercial grid via a power conditioning unit 4 having the functions of an inverter, etc.

The cell pack 2 is configured of a plurality of lithium secondary batteries connected in series. Alternatively, it is configured of a parallel connection of a plurality of battery units in which a plurality of cells are connected in series. In the following description, the voltage across the terminals of the cell pack 2 will be referred to as the "cell-pack voltage", the voltage across the terminals of each of the lithium secondary batteries constituting the cell pack 2 will be referred to as the "single-cell voltage", and each of the lithium secondary batteries will be referred to as a "cell".

The control unit 3 drives and controls the power conditioning unit 4 so that power stored in the cell pack 2 is supplied to the load 5 or the commercial grid at the time of discharging, whereas power is supplied from the commercial grid to the cell pack 2 at the time of charging.

The control unit 3 monitors the cell-pack voltage V and controls charging and discharging of the cell pack 2 so that the cell-pack voltage V comes in a low-degradation voltage range (higher than or equal to V2 and lower than or equal to V1) that is set on the basis of a target cell degradation rate. Specifically, when the cell-pack voltage V goes out of the low-degradation voltage range to the high-voltage side, the control unit 3 performs interpolation discharging so that the cell-pack voltage V comes back to the low-degradation voltage range. Similarly, when the cell-pack voltage V goes out of the low-degradation voltage range to the low-voltage side, the control unit 3 performs interpolation charging so that the cell-pack voltage V comes back to the low-degradation voltage range.

At this time, the control unit 3 performs complementary discharging or interpolation charging until the cell-pack voltage V coincides with a reference cell voltage that is set on the side of a high voltage region of the low-degradation voltage range, i.e., until the cell-pack voltage V coincides with a reference cell voltage that is set within the low-degradation voltage range in the vicinity of an upper-limit value V1. Through this control, it is possible to keep the cell-pack voltage V high, so that a greater amount of power can be supplied to the load 5 or the like when discharging is performed.

The complementary charging and complementary discharging described above may be performed when the cell-pack voltage V reaches a boundary voltage V1 or V2 of the low-degradation voltage range or goes beyond the boundary value, or may be performed during a charging and discharging permitted period if any such period is set.

Next, an example of the procedure for setting the upper-limit value V1 and the lower limit value V2 of the low-degradation voltage range will be described.

First, a target degradation rate D per day (%/day) is determined, and a single-cell voltage range with which the degradation rate per day becomes lower than or equal to the target degradation rate D (higher than or equal to V2' and lower than or equal to V1') is determined. At this time, the single-cell voltage range is set to be a range that does not exceed a single-cell voltage range that is set for a normal operation mode, which will be described later.

Figure 2:
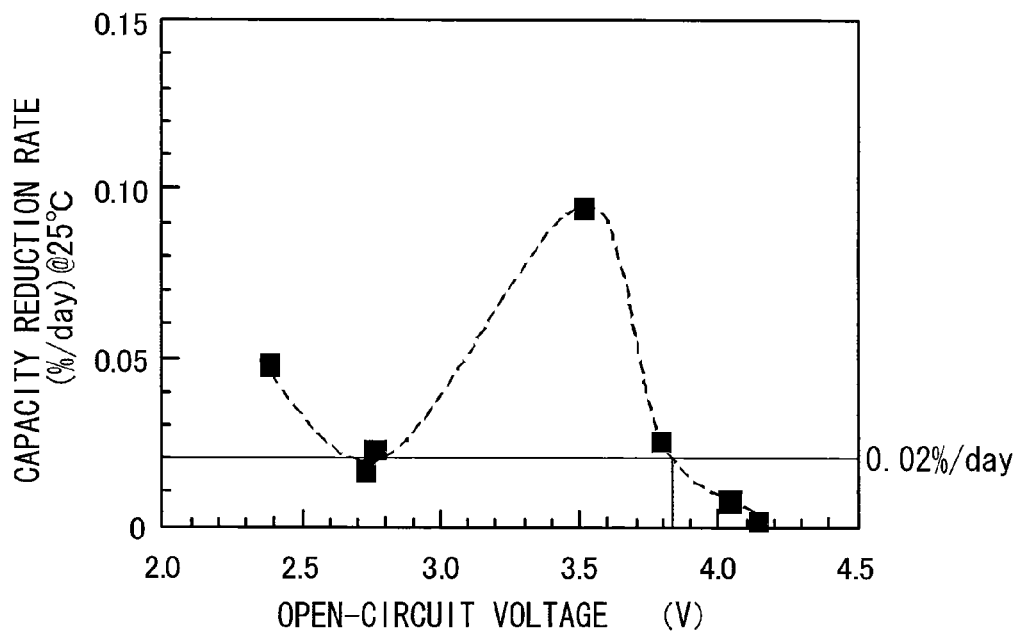
FIG. 2 is a diagram showing an example relationship between the open-circuit voltage and the capacity reduction rate.

For example, when the cells have the degradation characteristics shown in FIG. 2 and the target degradation rate D is 0.02 [%/day], the upper-limit value V1' of the single-cell voltage range is 4.2 V and the lower-limit value V2' thereof is 3.85 V.

In FIG. 2, the horizontal axis represents the open-circuit voltage, i.e., the single-cell voltage with no current flowing through the cell pack 2, and the vertical axis represents the capacity reduction rate per day, i.e., the cell degradation rate, at an environmental temperature of 25° C.

Here, the single-cell voltage range may be determined from the average characteristics of the cells or from a predicted worst-case value of the degradation rate. As described above, characteristics for determining the single-cell voltage range can be chosen as appropriate.

Next, the upper-limit value V1 of the low-degradation voltage range is determined by multiplying the upper-limit value V1' of the single-cell voltage range by the number of cells.

For example, when the upper-limit value V1' of the single-cell voltage range is "4.20 V" and the number of cells is 20, the upper-limit value V1 of the low-degradation voltage range can be calculated as in equation (1) below.

$$V1=4.2*20=84(V) \tag{1}$$

Alternatively, when there exists a voltage drop in the cell pack 2 due to the internal resistance of the cells and wire resistance or there exists characteristic variation among the cells, the upper-limit value V1 may be set by using equation (2) below in consideration of errors due to these elements.

For example, in the above conditions, assuming that the charging current is 10 A, the sum of the internal resistance and wire resistance of the cell pack as a whole is 0.2Ω, and the cell variation is maximum ±0.05 V, the upper-limit value V1 is set as follows.

$$V1=(4.2(V)-0.05(V))*20(\text{units})+10(A)*0.2(\Omega)=85(V) \tag{2}$$

Next, when the number of cells is 20, the lower-limit value V2 of the low-degradation voltage range is given by equation (3) below.

$$V2=3.85*20=77V \tag{3}$$

Alternatively, when the lower-limit value V2 is set in consideration of errors based on the various elements described above, equation (4) below is used.

$$V2=(3.85(V)+0.05(V))*20(\text{units})-10(A)*0.2(\Omega)=76(V) \tag{4}$$

The correcting term due to the charging or discharging current and the internal resistance and wire resistance in equations (2) and (4) above may be changed in accordance with the present current value.

The upper-limit value and the lower-limit value of the single-cell voltage range can be chosen as appropriate within such a range that the degradation rate per day is lower than or equal to the target degradation rate D [%/day]. Also, the low-degradation voltage range can be set as appropriate on the basis of the single-cell voltage range.

As described above, with the battery system according to this embodiment, when the cell-pack voltage V reaches the upper-limit value V1 of the low-degradation voltage range or exceeds the upper-limit value V1, the control unit 3 performs complementary discharging so that the cell-pack voltage V comes in the low-degradation voltage range. Furthermore, when the cell-pack voltage V reaches the lower-limit value V2 of the low-degradation voltage range or drops below the lower-limit value V2, the control unit 3 performs complementary charging so that the cell-pack voltage V comes in the low-degradation voltage range. Thus, it is possible to use and store the cell pack limited to within a voltage range with low cell degradation. Accordingly, it is possible to suppress cell degradation and thereby extend the battery life.

Although charging and discharging are controlled so that the cell-pack voltage V comes in the low-degradation voltage range in the embodiment described above, alternatively, charging and discharging may be controlled on the basis of the state of charge SOC of the cell pack.

In this case, for example, the control unit 3 has a table relating the state of charge SOC (%) and the cell-pack voltage V and calculates the state of charge SOC corresponding to the cell-pack voltage V from this relation table. Furthermore, states of charge SOC1 and SOC2 corresponding to the cell-pack voltages V1 and V2 are set in the control unit 3 as a low-degradation state-of-charge range corresponding to the low-degradation voltage range, and charging and discharging are controlled so that the state of charge SOC of the cell pack comes in the low-degradation state-of-charge range (higher than or equal to SOC2 and lower than or equal to SOC1).

Figure 3:
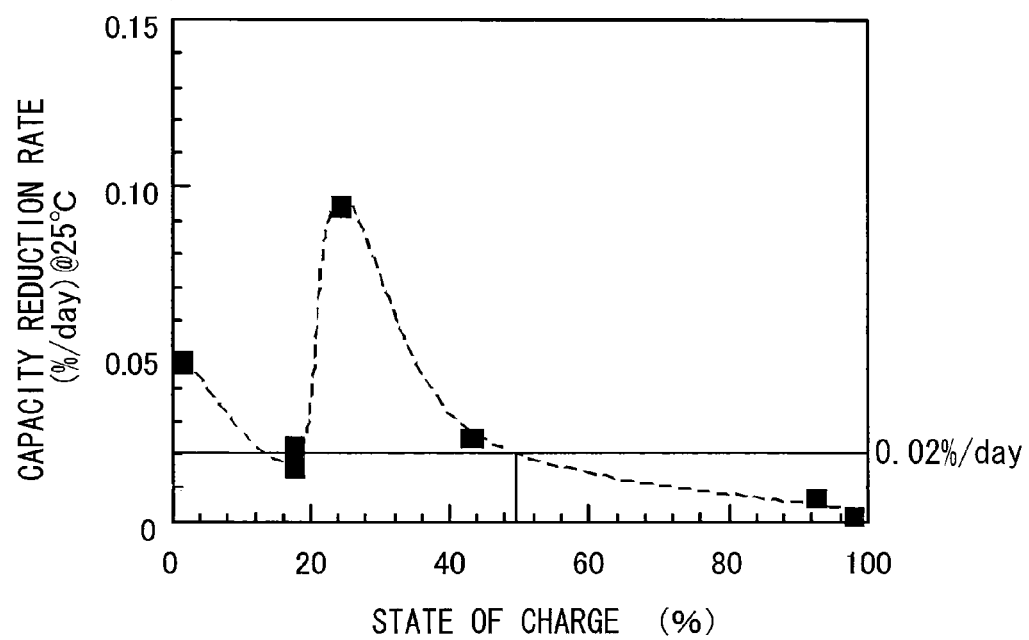
FIG. 3 is a diagram showing an example relationship between the state of charge and the capacity reduction rate.

Regarding the low-degradation state-of-charge range, instead of obtaining states of charge corresponding to the cell-pack voltages V1 and V2 by using the relation table, a state-of-charge range with which the cell degradation rate becomes lower than or equal to the target degradation rate D may be obtained by using degradation characteristics representing the cell degradation rate in relation to the state of charge, as shown in FIG. 3. In FIG. 3, the horizontal axis represents the state of charge, and the vertical axis represents the capacity reduction rate per day at an environmental temperature of 25° C.

Second Embodiment

Next, a battery system according to a second embodiment of the present invention will be described.

As opposed to the battery system 1 according to the first embodiment described above, in which charging and discharging are controlled on the basis of the cell-pack voltage V, in this embodiment, charging and discharging are controlled on the basis of the single-cell voltages of the cells.

Hereinafter, a description of commonalities with the first embodiment described above will be omitted, and differences will be mainly described.

Figure 4:
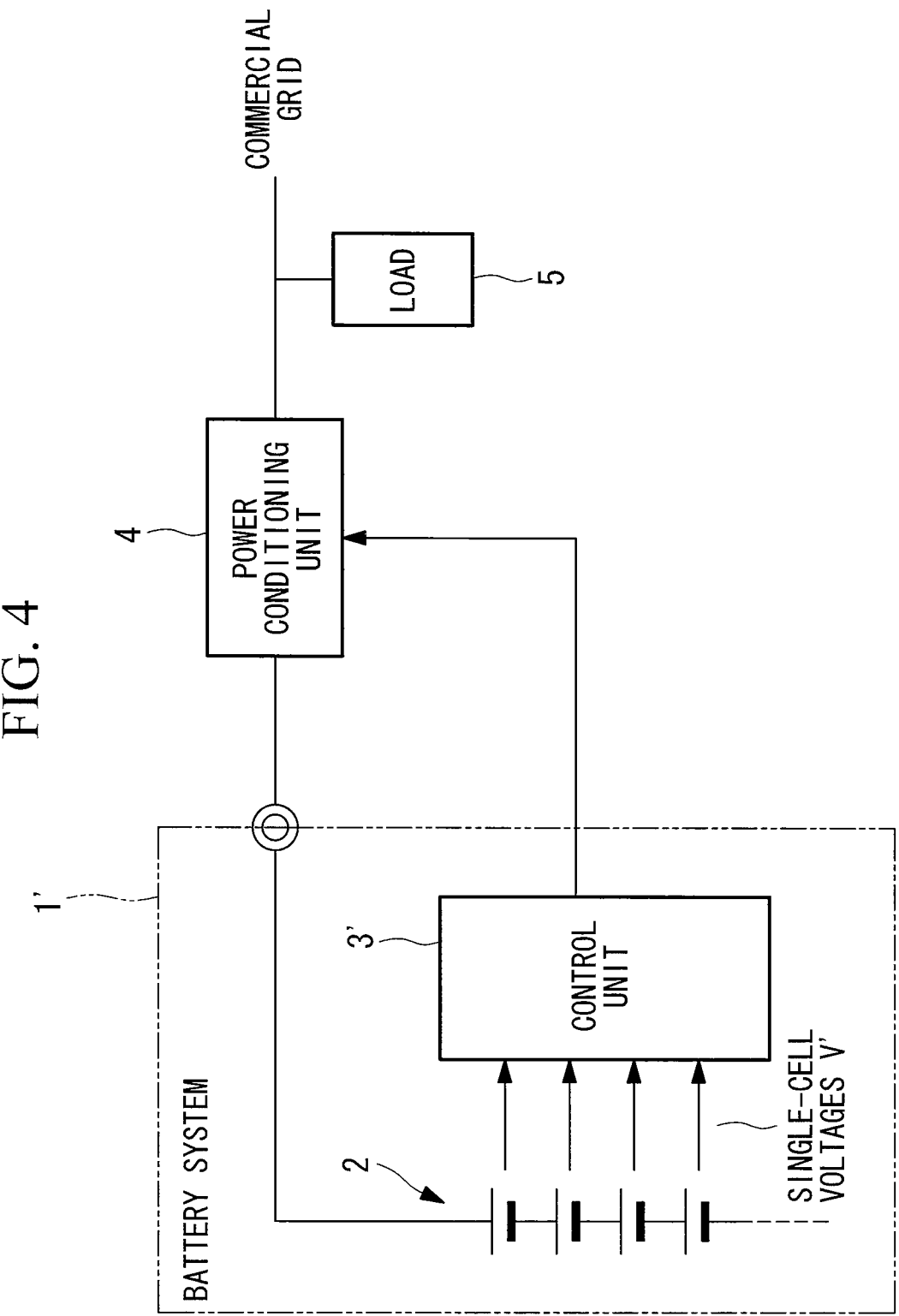
FIG. 4 is a diagram schematically showing the configuration of a battery system according to a second embodiment of the present invention.

FIG. 4 schematically shows the configuration of a battery system 1' according to this embodiment. In FIG. 4, the same components as in FIG. 1 are designated by the same reference signs.

As shown in FIG. 4, a control unit 3' of the battery system according to this embodiment receives input of single-cell voltages V' of the individual battery cells.

The control unit 3' controls charging and discharging so that the single-cell voltages V' of the individual battery cells come in a low-degradation voltage range that is set on the basis of the cell degradation rate. Specifically, when any single-cell voltage V' reaches or exceeds an upper-limit value V1' of the low-degradation voltage range, complementary discharging is performed so that the single-cell voltage V' comes back to the low-degradation voltage range. Similarly, when any single-cell voltage V' reaches or drops below a lower-limit value V2' of the low-degradation voltage range, complementary charging is performed so that the single-cell voltage V' comes back to the low-degradation voltage range.

This complementary charging and complementary discharging may be performed immediately when any single-cell voltage V' goes out of the low-degradation voltage range or may be performed during a charging and discharging permitted period if any such period is set.

Next, the low-degradation voltage range is determined, for example, by the following procedure.

First, a target degradation rate D per day (%/day) is determined, and a low-degradation voltage range (higher than or equal to V2' and lower than or equal to V1') with which the degradation rate per day becomes lower than or equal to the target degradation rate D is determined. For example, when the cells have the degradation characteristics shown in FIG. 2 and the target degradation rate is 0.02 (%/day), the low-degradation voltage range can be set arbitrarily within a range higher than or equal to 3.85 V and lower than or equal to 4.2 V. For example, it is possible to set 4.2 V as the upper-limit value V1' and 3.85 V as the lower-limit value V2'.

Here, the low-degradation voltage range may be determined from the average characteristics of the cells or from a predicted worst-case value of the degradation rate. As described above, characteristics for determining the low-degradation voltage range can be chosen as appropriate.

Furthermore, as the single-cell voltages V' of the cells used for comparison, any of the maximum voltage, average voltage, and minimum voltage of the cells in the battery system may be used.

Similarly to the first embodiment described above, the upper-limit value V1' and the lower-limit value V2' of the low-degradation voltage range may be set as follows in consideration of a case where there exists a voltage drop due to the internal resistance of the cells and the wire resistance.

For example, assuming that the charging current at the time of charging for the single-cell voltage is 10 A and the sum of the cell internal resistance of the cell and the wire resistance is 0.01Ω, the upper-limit value V1' is calculated as in equation (5) below.

$$V1'=4.2(V)+10(A)*0.01(\Omega)=4.3(V) \quad (5)$$

Similarly, the lower-limit value V2' is calculated as in equation (6) below.

$$V2'=3.85(V)-10(A)*0.01(\Omega)=3.75(V) \quad (6)$$

The correcting term due to the charging or discharging current and the internal resistance and wire resistance in equations (5) and (6) above may be changed in accordance with the present current value.

In this embodiment, if the performance variation among the cells is considerable so that it is not possible to accommodate all the single-cell voltages within the low-degradation voltage range, priority may be given to either the upper-limit value V1' or the lower-limit value V2'.

For example, if priority is given to the upper-limit value V1', when any single-cell voltage V' exceeds the upper limit value V1', complementary discharging is performed so that all the single-cell voltages become lower than or equal to the upper-limit value V1'. In this case, the complementary discharging is continued even if the single-cell voltage of any other cell becomes lower than or equal to the lower-limit value V2' while the complementary discharging is being performed. Furthermore, when any single-cell voltage V' drops below the lower-limit value V2', complementary charging is performed so that all the single-cell voltages become higher than or equal to the lower-limit value V2'. In this case, the complementary charging is stopped when the single-cell voltage of any other cell reaches the upper-limit value V1' during the complementary charging.

On the other hand, if priority is given to the lower-limit value V2', when any single-cell voltage goes beyond the lower-limit value V2', complementary charging is performed so that all the single-cell voltages become higher than or equal to the lower-limit value V2'. In this case, the complementary charging is continued even if the single-cell voltage of any other cell becomes higher than or equal to the upper-limit value V1' while the complementary charging is being performed. Furthermore, when any single-cell voltage V' exceeds the upper-limit value V1', complementary discharging is performed so that all the single-cell voltages become lower than or equal to the upper-limit value V1'. In this case, the complementary discharging is stopped when the single-cell voltage of any other cell reaches the lower-limit value V2' during the complementary discharging.

As described above, with the battery system 1' according to this embodiment, when any single-cell voltage V' reaches the upper-limit value V1' of the low-degradation voltage range or exceeds the upper-limit value V1', the control unit 3' performs complementary discharging so that the single-cell voltage V' comes in the low-degradation voltage range. Furthermore, when any single-cell voltage V' reaches the lower-limit value V2' of the low-degradation voltage range or drops below the lower-limit value V2', the control unit 3' performs complementary charging so that the single-cell voltage V' comes in the low-degradation voltage range. As described above, since voltages are monitored on a cell-by-cell basis, it becomes possible to control charging and discharging more finely. Furthermore, even if performance variation exists among the cells, the single-cell voltages of the individual cells can be kept within the low-degradation voltage range whenever possible.

Although charging and discharging are controlled so that the single-cell voltages V' come in the low-degradation voltage range in the embodiment described above, alternatively, charging and discharging may be controlled on the basis of the states of charge SOC' of the cells.

In this case, for example, the control unit 3' has a table relating the states of charge SOC (%) and the single-cell voltages V' and calculates the states of charge SOC corresponding to the single-cell voltages V' from this relation table. Furthermore, states of charge SOC1' and SOC2' corresponding to the single-cell voltages V1' and V2' are set in the control unit 3' as a low-degradation state-of-charge range, and charging and discharging are controlled so that the state of charge SOC' of each cell comes in the low-degradation state-of-charge range (higher than or equal to SOC2' and lower than or equal to SOC1').

Regarding the state-of-charge range, instead of obtaining the states of charge corresponding to the single-cell voltages V1' and V2' by using the relation table, for example, a state-of-charge range with which the cell degradation rate becomes lower than or equal to the target degradation rate D may be obtained by using degradation characteristics representing the cell degradation rate in relation to the state of charge, as shown in FIG. 3.

Third Embodiment

Next, a battery system according to a third embodiment of the present invention will be described.

In the battery system according to the first or second embodiment described above, in order to suppress cell degradation, charging and discharging are performed so that the cell-pack voltage V or the single-cell voltages V' are in the low-degradation voltage range, so that it is not possible to effectively use the energy stored in the cell pack 2.

In this embodiment, a "low-degradation operation mode", in which cell degradation is suppressed by performing charging and discharging within the low-degradation voltage range described above, and a "normal operation mode", in which charging and discharging are performed in a voltage range wider than the low-degradation voltage range so that the energy stored in the cell pack 2 can be used effectively, are provided, and a suitable operation mode can be selected in accordance with the power required by the load 5, etc.

Here, the "normal operation mode" is an operation mode in which charging and discharging are performed within a preset permitted voltage range (e.g., higher than or equal to 2.2 V and lower than 4.2 V). The permitted voltage range is set so as to have a voltage width (upper-limit value−lower-limit value) wider than the voltage width of the low-degradation voltage range described above.

Furthermore, in the "normal operation mode", charging and discharging are performed according to preset control conditions.

FIG. 5 is a table showing an example of various operation modes belonging to the normal operation mode. As shown in FIG. 5, for example, in grid-connected load leveling, the control unit 3 controls the power conditioning unit 4, etc. so that grid power is supplied to the cell pack 2 in a preset charging period and so that power is supplied from the cell pack 2 to the load 5 in a preset discharging period. In grid-connected peak clipping, the control unit 3 controls the power conditioning unit 4, etc. so that grid power is supplied to the cell pack 2 in a preset charging period and so that power exceeding the contract power is supplied from the cell pack 2 to the load 5 in a preset discharging period. Furthermore, as for forced charging and forced discharging, when an instruction for charging or discharging is input by a user, charging or discharging is performed forcibly according to the instruction.

Switching between the "normal operation mode" and the "low-degradation operation mode" described above may be performed either manually or automatically.

The battery system is provided with an input unit (not shown) for a user to instruct mode switching, and the control unit 3 controls charging and discharging in the specified operation mode according to the operation-mode switching instruction. Furthermore, it is possible to input conditions for automatic switching from the input unit. For example, by setting seasons, months, days of week, hours, or the like, it is possible to schedule mode switching. Alternatively, instead of setting mode-switching conditions on the basis of the day and hour or the like, for example, mode-switching conditions may be set on the basis of the required power, etc. As described above, the mode-switching conditions are not particularly limited.

Alternatively, operation-mode switching conditions may be registered in advance, and switching of the operation modes may be performed automatically according to the switching conditions.

In the case where switching among the operation modes is performed automatically, for example, mode switching may be performed according to the following conditions.

When the battery system is applied to a power storage system in which the cell pack 2 is charged with power from the commercial grid during a nighttime period (e.g., from 23:00 to 6:00 next day), when the power charge is inexpensive, and in which power stored in the cell pack 2 is supplied to the load 5 or the like during a daytime period (e.g., from 6:00 to 23:00), when the power charge is relatively expensive, switching of the operation modes is performed by performing the following determination.

In this case, the control unit 3 determines whether the state is a low-load state or a normal-load state at the time of discharging (e.g., from 6:00 to 23:00). For example, the control unit 3 measures the single-cell voltages V', the cell-pack voltage V, the discharging power W, and the discharging current I at the time of discharging and calculates at least one of the maximum value, minimum value, average value, and cumulative value during a predetermined period (hour, day, week, month, or the like) for each of these measured values.

Then, it is determined that the state is the low-load state when one of the measured values and calculation results satisfies one of requirements 1-1 to 1-6 listed in condition 1 below. On the other hand, it is determined that the state is the normal-load state when one of the measured values and calculation results satisfies one of requirements 2-1 to 2-6 listed in condition 2 below.

When the state is the low-load state, cell degradation is suppressed by setting the "low-degradation operation mode" as the operation mode. On the other hand, when the state is the normal-load state, the "normal operation mode" is set as the operation mode so that power stored in the cell pack 2 is discharged actively, thereby using the power of the cell pack 2 effectively.

Condition 1

Requirement 1-1: The minimum value of the single-cell voltages V' is greater than or equal to a preset low-degradation-operation transition value $V_p'$ Requirement 1-2: The minimum value of the cell-pack voltage V is greater than or equal to a preset low-degradation-operation transition value $V_p$ Requirement 1-3: The maximum value of the discharging power W is less than or equal to a preset low-degradation-operation transition value $W_p$ Requirement 1-4: The maximum value of the discharging current I is less than or equal to a preset low-degradation-operation transition value $I_p$ Requirement 1-5: The cumulative value of the electrical energy Wh is less than or equal to a preset low-degradation-operation transition value $Wh_f$ Requirement 1-6: The cumulative value of the amount of current Ah is less than or equal to a preset low-degradation-operation transition value $Ah_f$ Condition 2

Requirement 2-1: The measured values of the single-cell voltages V' are less than or equal to a preset normal-operation transition value $V_q'$ Requirement 2-2: The measured value of the cell-pack voltage V is less than or equal to a preset normal-operation transition value $V_q$ Requirement 2-3: The measured value of the discharging power W is greater than or equal to a preset normal-operation transition value $W_q$ Requirement 2-4: The measured value of the discharging current I is greater than or equal to a preset normal-operation transition value $I_q$ Requirement 2-5: The cumulative value of the electrical energy Wh is greater than or equal to a preset normal-operation transition value $Wh_j$ Requirement 2-6: The cumulative value of the amount of current Ah is greater than or equal to a preset normal-operation transition value $Ah_j$ Each of the above low-degradation-operation transition values and normal-operation transition values can also be specified by storing the maximum value, minimum value, average value, and cumulative value of the previous iteration in a memory and specifying the percentage change of the latest data relative to the stored data.

As described above, with the battery system according to this embodiment, since the "normal operation mode" and the "low-degradation operation mode" are provided, it becomes possible to adopt a suitable operation mode in accordance with the situation, such as the power required by the load 5.

Thus, for example, in a normal-load state, by setting the "normal operation mode", the battery capacity can be used fully, so that it becomes possible to effectively use power stored in the cell pack. On the other hand, in a low-load state, by setting the "low-degradation operation mode", the discharging current is minimized, so that it becomes possible to suppress cell degradation.

Furthermore, by performing switching of the operation modes automatically, it becomes possible to set a suitable operation mode in accordance with the usage state of the battery without requiring a user's manual operation.

Although the embodiments of the present invention have been described above in detail with reference to the drawings, the specific configuration is not limited to the embodiments, and design modifications or the like not departing from the spirit of the present invention are encompassed.

The invention claimed is:

1. A battery system comprising:
a battery unit having at least one lithium secondary battery that uses a manganese-based cathode material; and
a control unit that controls charging and discharging of the battery unit,
wherein the control unit controls charging and discharging within a low-degradation voltage range that is set on the basis of a target cell degradation rate.

2. A battery system according to claim 1, wherein when a cell voltage goes out of the low-degradation voltage range, the control unit performs charging or discharging until the cell voltage coincides with a reference cell voltage that is set within the low-degradation voltage range on a high-voltage side.

3. A battery system according to claim 1, wherein a plurality of operation modes including a low-degradation operation mode is provided, and
wherein the control unit controls charging or discharging within the low-degradation voltage range when the low-degradation operation mode is selected.

4. A battery system comprising:
a battery unit having at least one lithium secondary battery that uses a manganese-based cathode material; and
a control unit that controls charging and discharging of the battery unit,
wherein the control unit controls charging and discharging within a low-degradation state-of-charge range that is set on the basis of a target cell degradation rate.

5. A battery system according to claim 4, wherein when a state-of-charge goes out of the low-degradation state-of-charge range, the control unit performs charging or discharging until the state of charge coincides with a reference state of charge that is set within the low-degradation state-of-charge range on a high-state-of-charge side.

6. A battery system according to claim 4, wherein a plurality of operation modes including a low-degradation operation mode is provided, and
wherein the control unit controls charging and discharging within the low-degradation state-of-charge range when the low-degradation operation mode is selected.

7. A battery system according to claim 3, comprising an input unit for manually setting switching of the operation modes.

8. A battery system according to claim 6, comprising an input unit for manually setting switching of the operation modes.

9. A battery system according to claim 3, wherein a switching condition of the operation modes is registered in advance in the control unit, and switching of the operation modes is performed on the basis of the switching condition.

10. A battery system according to claim 6, wherein a switching condition of the operation modes is registered in advance in the control unit, and switching of the operation modes is performed on the basis of the switching condition.

11. A battery system according to claim 1, used in a power storage system in which charging is performed in a preset period and discharging is performed in a preset period.

12. A battery system according to claim 4, used in a power storage system in which charging is performed in a preset period and discharging is performed in a preset period.

13. A battery system according to claim 11, wherein the period for charging is set at nighttime and the period for discharging is set at daytime.

14. A battery system according to claim 12, wherein the period for charging is set at nighttime and the period for discharging is set at daytime.

* * * * *